Dec. 29, 1925.
C. M. FAHNESTOCK
1,567,933
STEERING ATTACHMENT MECHANISM
Filed Nov. 27, 1922
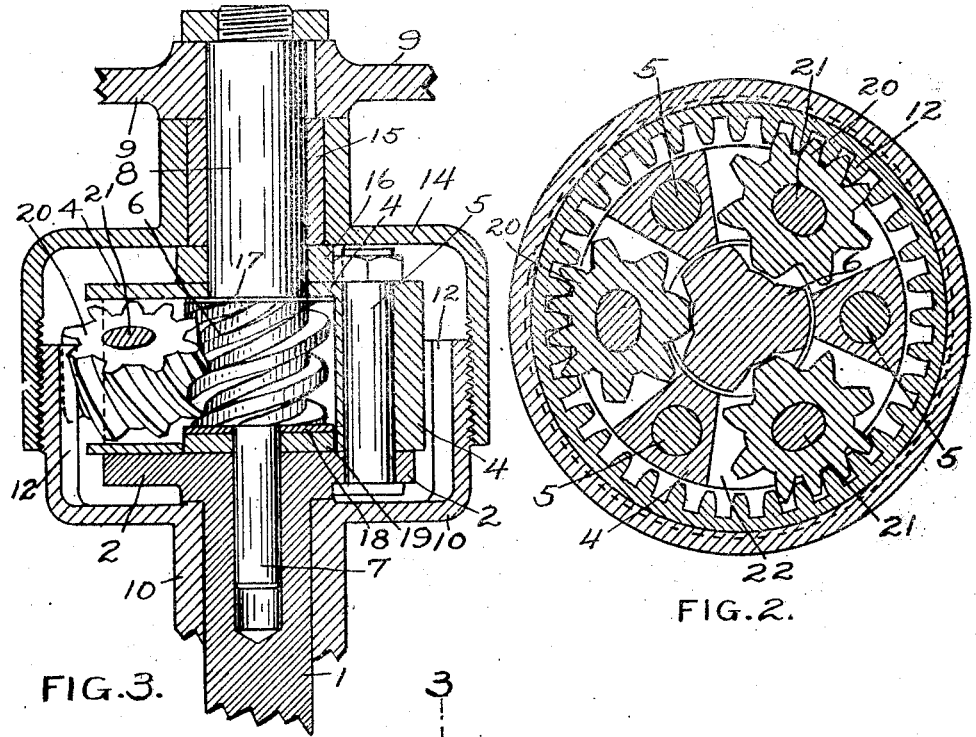
FIG. 3.
FIG. 2.
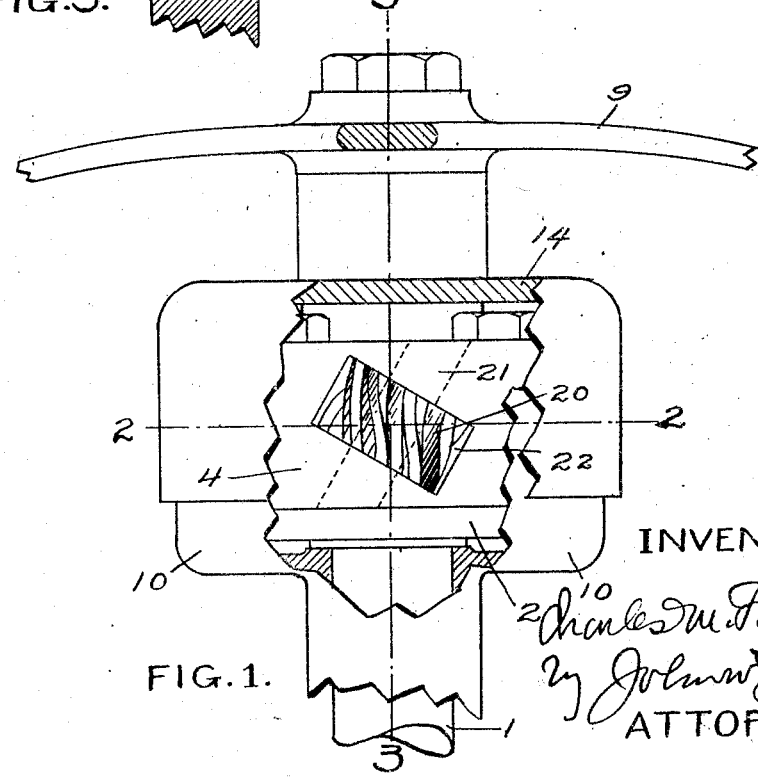
FIG. 1.
INVENTOR
Charles M. Fahnestock
By John W. Sheller
ATTORNEY Patented Dec. 29, 1925.

1,567,933

UNITED STATES PATENT OFFICE.

CHARLES M. FAHNESTOCK, OF CINCINNATI, OHIO.

STEERING-ATTACHMENT MECHANISM.

Application filed November 27, 1922. Serial No. 603,643.

*To all whom it may concern:*

Be it known that I, CHARLES M. FAHNESTOCK, a citizen of the United States, residing at the city of Cincinnati, in the county of Hamilton and State of Ohio, have invented certain new and useful Improvements in Steering-Attachment Mechanism, of which the following is a specification.

My invention relates to the steering mechanism of automobiles and motor-driven vehicles.

The object of my invention is to prevent transmission to the steering wheel of the shocks upon the running gear, and thereby prevent accidents due to the driver losing control of his machine through encountering ruts, chuck-holes, and the like.

It is particularly applicable to that class of steering mechanism in which the reduction of motion from the steering wheel to the running gear is accomplished through the agency of a planetary gear mechanism.

In the form of planetary gear mechanism in use, the shock on the running gear is transmitted to the steering wheel with an intensity proportional to the gear reduction.

My device is so constructed that the shock on the running gear is transposed from a lateral force to a force in a direction parallel to the axis of the worm, which is absorbed within the mechanism, to the extent that the most severe shock upon the running gear is scarcely perceptible in the steering wheel making it practically impossible for any force upon the running gear to throw the steering wheel beyond the driver's control.

In the accompanying drawing forming a part of the specification:

Fig. 1, is a side elevation, parts broken away to illustrate construction, and parts in section, Fig. 2, is a section on line 2—2 of Fig. 1, and Fig. 3, is a section on line 3—3, of Fig. 1.

In the practical application of my device, the shaft 1, (which is connected at its lower extremity in the usual manner to the running gear), carries at its upper end a plate 2, upon which a housing 4 is secured by the bolts 5.

Within this housing is mounted the worm or screw 6 at the lower end of which is formed the stub shaft 7, having its bearing in the steering shaft 1. At the upper end of the worm 6 is provided a shaft 8, adapted to be controlled by the steering wheel 9. Mounted on the body of the car and secured against rotation in the usual manner is the cup shaped piece 10, the upper part of which is formed into an internal gear or equivalent 12, and the lower part forms a bearing for shaft 1.

A cap 14, with the bushing 15, is screwed on the piece 10, and forms the upper bearing for the shaft 8, the collar 16 acting to maintain the relation of housing 4 and cap 14. Within the housing, above the worm 6, is a washer 17, and below the worm are two thrust washers 18—19. In the housing 4 are provided recesses 22, adapted to receive spirally cut gears 20, which are so mounted that they mesh with the internal gear 12 and also mesh with the worm 6. The gears 20 are mounted on short shafts 21, having their bearing in the housing 4.

In the present instance I show three spiral gears 20; I may use a less or a greater number, as found practicable or desirable.

When the automobile is in motion and running and encounters obstructions of various kind, ruts and the like, the front wheels are thrown out of line, or out of normal position, and the running gear is deflected from a normal position; the shocks encountered are transmitted to the steering rod and steering wheels making it hard for the operator to operate the machine, and often causing him to lose control thereof, also, forcing a hard task upon the operator to properly guide the machine and causing great inconvenience.

In order to prevent such shocks from being transmitted to a maximum degree to the steering mechanism, and wheel, as is now the case, I, by my invention, minimize such shocks and absorb them, by changing any lateral force or tendency to side motion to a force in a direction parallel to the axis of the worm, and absorb it within the mechanism.

Any shock to the running gear is transmitted through the steering shaft 1, through the bolts 5, to the housing 4, which carries the idle gears 20, meshing with the internal gear 12.

This shock tends to rotate the gears 20 on their shafts 21, and transmit the force to the worm 6, thereby transposing the lateral force to a force in a direction parallel to the axis of the worm, and for this reason this shock is kept within the housing within the thrust washers 17, 18, and 19, which cannot therefore reach the steering wheel.

What I claim as new and my invention, and desire to secure by Letters Patent is:

1. In combination with a motor driven vehicle, a steering wheel, a driving shaft actuated by said steering wheel, a helical driving gear on said shaft, a frame for said gear, a driven shaft in line with said driving shaft and fixed to said frame, an internal gear surrounding said frame and fixed against rotation, and helical gears mounted in said frame and meshing with said driving gear and internal gear.

2. A steering mechanism for motor vehicles including a driven shaft, a frame carried by the head of said shaft, a steering wheel, a driving shaft fixed to the steering wheel, a worm gear fixed to the driving shaft and arranged in said frame, shafts inclined relatively to the driving and driven shaft and carried by said frame, worm gears mounted on the inclined shafts and meshing with the first mentioned worm gear, and a stationary worm gear meshing with the worm gears of the inclined shafts, the teeth of said gears being arranged at such angles relatively to one another as to permit turning of the driven shaft from the driving shaft but preventing turning of the driving shaft from the driven shaft.

3. A motor vehicle steering mechanism including a driven shaft having an enlarged head, a frame resting on said head and having radially disposed apertures, bolts inclined relatively to the axis of said shaft, connecting the frame to said head and forming inclined shafts, worm gears mounted on said inclined shafts and arranged in said apertures, a driving shaft having a steering wheel at one of its ends, a worm gear fixed on the driving shaft, arranged in said frame and meshing with the gears on the inclined shafts, a casing surrounding said frame, and a fixed worm gear secured to the casing and meshing with the gears on the inclined shafts, the teeth of the gears being arranged at such angles relatively to one another as to permit the driven shaft to be turned from the driving shaft but preventing the driving shaft from being turned from the driven shaft.

4. In combination with a motor driven vehicle, a driven shaft, a gear frame mounted on one end of said shaft, an internal gear surrounding said frame and secured against rotation, a steering wheel, a driving shaft in line with said driven shaft and operated by said steering wheel, a helical driving gear on said driving shaft and arranged in said gear frame, and helical gears mounted in said gear frame and meshing with said driving gear and internal gear, said gears having their teeth arranged at angles to permit turning of the driven shaft from the driving shaft but preventing turning of the driving shaft from the driven shaft.

In testimony whereof, I affix my signature at Cincinnati, Ohio, this 22nd day of November, 1922.

CHARLES M. FAHNESTOCK.